_United States Patent Office_ 3,066,154
Patented Nov. 27, 1962

3,066,154
19-NOR-STEROIDS AND A METHOD OF PRODUCING SAME
Leon Velluz and Bernard Goffinet, Paris, Julien Warnant, Neuilly-sur-Seine, and Gaston Amiard, Noisy-le-Sec, France, assignors, by mesne assignments, to Roussel-UCLAF S.A., Paris, France, a corporation of France
No Drawing. Filed June 12, 1958, Ser. No. 741,468
Claims priority, application France June 14, 1957
4 Claims. (Cl. 260—397.2)

The present invention relates to 19-nor-steroids and, more particularly, to 19-nor-cholesterol and 19-nor-7,8-dehydrocholesterol and to a process of preparing same.

Said 19-nor-steroids of Formula I

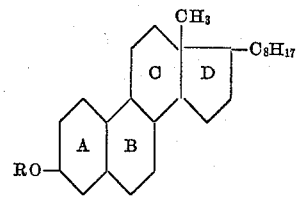

wherein ring B contains one double bond in the $\Delta^5$-position or two double bonds in the $\Delta^{5,7}$-positions and R indicates hydrogen, an alkyl radical, preferably a lower alkyl radical, an acyl group, preferably a lower alkanoyl group, or a substituted or unsubstituted benzoyl group such as a 3,5-dinitro benzoyl group, are of great interest as starting materials in the process of preparing steroid compounds analogous to those having a methyl group in position 10. Valuable steroid compounds may be prepared from cholesterol or 7,8-dehydrocholesterol either before or after partial or total degradation of the side chain. When starting from 19-nor-cholesterol, obtained according to the present invention, 19-nor-testosterone or 19-nor-progesterone may be obtained by such partial or total degradation of the side chain. By the combined action of certain microorganisms and reactions as they have been used previously with progesterone, 19-nor-progesterone, for instance, may be converted to 19-nor-cortisone, 19-nor-$\Delta^1$-dehydrocortisone, 19-nor-hydrocortisone, 19-nor-$\Delta^1$-dehydrocortisol, and the like. Such steroid compounds are of great pharmaceutical interest.

It is one object of the present invention to provide 19-nor-cholesterol and 19-nor-7,8-dehydrocholesterol.

Another object of the present invention is to provide suitable starting materials for the synthesis of 19-nor-cholesterol and 19-nor-7,8-dehydrocholesterol.

Still another object of the present invention is to provide a simple and effective process of producing said steroid compounds and valuable starting materials useful in their preparation.

Other objects of the present invention and advantageous features thereof will become apparent as the description proceeds.

In principle, the present invention consists in using 19-nor-3-hydroxy-1,3,5(10)-cholestatriene of Formula II

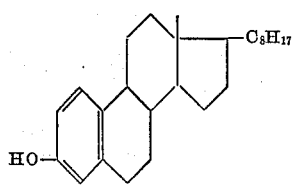

as starting material which may be prepared from 1,4,6-cholestatriene-3-one according to Romo, Rosenkranz, and Djerassi, J. Org. Chem., vol. 15, page 1291 (1950).

The synthetic process of preparing 19-nor-cholesterol, 19-nor-7,8-dehydrocholesterol and their esters from said starting material of Formula II according to the present invention makes use of the following new derivatives of said steroid compound which have not yet been described heretofore:

The loweralkyl ether and preferably the methyl ether of 19-nor-3-hydroxy-1,3,5(10)-cholestatriene of Formula III:

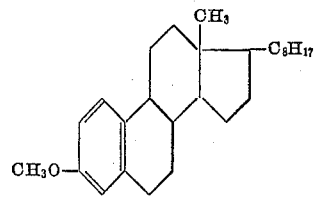

19-nor-3-(lower) alkoxy-$\Delta^{2,5(10)}$-cholestadiene and especially 19-nor-3-methoxy-$\Delta^{2,5(10)}$-cholestadiene of Formula IV:

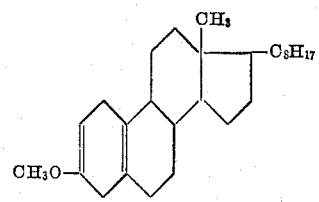

19-nor-$\Delta^4$-cholestene-3-one of Formula V:

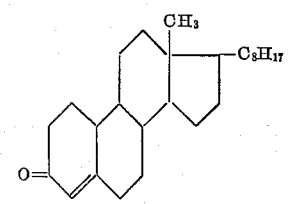

19-nor-3-(lower) alkanoyloxy-$\Delta^{3,5}$-cholestadiene and especially 19-nor-3-acetoxy-$\Delta^{3,5}$-cholestadiene of Formula VI:

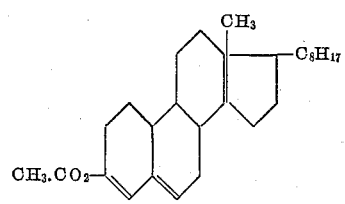

19-nor-6-halogeno-$\Delta^4$-cholestene-3-one and especially 19-nor-6-bromo cholestene-3-one of Formula VII:

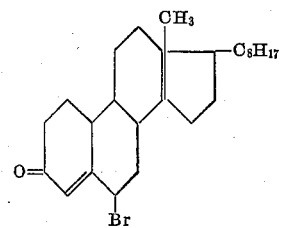

19-nor-$\Delta^{4,6}$-cholestadiene-3-one of Formula VIII:

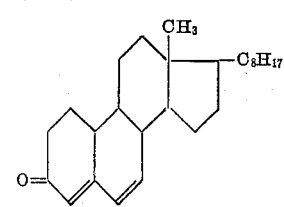

19-nor-3-(lower) alkanoyloxy-$\Delta^{3,5,7}$-cholestatriene and especially 19-nor-3-acetoxy-$\Delta^{3,5,7}$-cholestatriene of Formula IX:

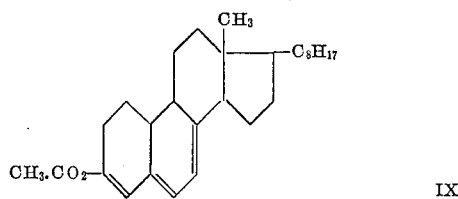

IX and the esters and, more particularly, the 3,5-dinitrobenzoates of 19-nor-cholesterol and 19-nor-7,8-dehydrocholesterol of Formula I.

The process according to the present invention starts with the compound of Formula II and proceeds by way of the compounds of Formulas III, IV, V, and VI to yield 19-nor-cholesterol of Formula I wherein ring B contains one double bond in $\Delta^5$-position and R is hydrogen. Compound VI may then be converted by way of the compounds of Formulas VII, VIII, and IX to 19-nor-7,8-dehydrocholesterol of Formula I wherein ring B contains two double bonds in $\Delta^{5,7}$-positions and R is hydrogen.

More in particular, to produce 19-nor-cholesterol according to the present invention, the starting material 19-nor-3-hydroxy-1,3,5(10)-cholestatriene of Formula II is converted to the corresponding 3-methoxy compound of Formula III by means of dimethyl sulfate or diazomethane. The ether compound of Formula III is reduced by means of lithium metal in liquid ammonia at a low temperature to yield 19-nor-3-methoxy-$\Delta^{2,5(10)}$-cholestadiene of Formula IV which is converted by the action of mineral acids into 19-nor-cholestenone of Formula V. By subjecting said compound to the action of a mixture of acetyl chloride and acetic acid anhydride in the presence of pyridine, 19-nor-3-acetoxy-$\Delta^{3,5}$-cholestadiene of Formula VI is formed which is readily reduced by means of an alkali metal boron hydride such as sodium or potassium boron hydride with simultaneous saponification of the enolic 3-acetoxy group, to 19-nor-cholesterol. 19-nor-cholesterol is purified and characterized by its 3,5-dinitrobenzoate.

On the other hand, when subjecting 19-nor-3-acetoxy-$\Delta^{3,5}$-cholestadiene of Formula VI to the action of bromine in a mixture of acetic acid and collidine, 19-nor-6-bromo cholestenone of Formula VII is formed which, without further purification, is converted into 19-nor-$\Delta^{4,6}$-cholestadiene-3-one of Formula VIII by the reaction of lithium bromide-lithium carbonate in the presence of dimethyl formamide. By means of a mixture of acetyl chloride and acetic acid anhydride in the presence of pyridine, the hydroxyl group of the corresponding enol of said compound is acetylated to form 19-nor-3-acetoxy-$\Delta^{3,5,7}$-cholestatriene of Formula IX which is then reduced by means of an alkali metal boron hydride, such as the sodium or potassium boron hydride, with simultaneous saponification of the 3-acetoxy group, to 19-nor-7,8-dehydrocholesterol which is preferably isolated in the form of its 3,5-dinitrobenzoate. Saponification of said compound yields pure 19-nor-7,8-dehydrocholesterol. In the course of the process of preparing 19-nor-7,8-dehydrocholesterol, 19-nor-cholesterol may also be converted to 19-nor-$\Delta^{4,6}$-cholestadiene-3-one of Formula VIII by reaction of manganese dioxide, but the yields in this mode of operation are not as good as when proceeding as described hereinabove.

The following examples serve to illustrate the present invention without, however, limiting the same thereto. More particularly, the nature of the solvents may be changed, other esters than the acetate of the enols formed in the course of the process may be prepared, the reaction temperature, may be varied, hydrogen bromide may be split off from the 6-bromo compound of Formula VII by other means than those described hereinabove and other changes and variations in the procedure may be made by those skilled in the art in accordance with the principles set forth herein and in the claims annexed hereto.

The melting points given in the examples are points of instantaneous melting determined on the Maquenne block.

EXAMPLE 1

*Preparation of 19-Nor-Cholestene-3-One (Formula V)*

10 g. of 19-nor-3-hydroxy-1,3,5(10)-cholestatriene of Formula I and of the melting point of 113–115° C., prepared as described by J. Romo, G. Rosenkranz, and C. Djerassi in "J. Org. Chem.," vol. 15, page 1291 (1950), are dissolved in 200 cc. of boiling ethanol while passing nitrogen through the reaction vessel. The reaction mixture is boiled under reflux while passing nitrogen therethrough. 15 cc. of 2 N sodium hydroxide solution and 2.8 cc. of dimethyl sulfate are added in 5 portions in intervals of several minutes between each addition, whereby refluxing is continued. After the addition is completed, the reaction mixture is concentrated in a vacuum in order to remove the ethyl alcohol. 50 cc. of water are added to the residue and the mixture is extracted by means of isopropyl ether. The extract is washed with water until the wash waters are neutral, dried over anhydrous magnesium sulfate, and evaporated to dryness in a vacuum. The crystalline residue, which weighs 10.3 g., represents crude 19-nor-3-methoxy-$\Delta^{1,3,5(10)}$-cholestatriene of Formula III. It is added to 1 l. of liquid ammonia cooled to −65° C. to −70° C. 800 cc. of anhydrous ether are added while stirring, so as to produce a homogeneous solution. 10 g. of lithium metal are added in small portions without allowing the temperature to rise. After the addition is completed, the reaction mixture is allowed to stand at −65° C. for the same period of time, i.e., for a period of about 1½ hours, from the beginning of the reduction step. 150 cc. of ethanol are added. The colorless solution is allowed to stand so that the liquid ammonia evaporates spontaneously until the temperature of the mixture has attained a temperature of about +10° C. While cooling, 1 l. of water is added. The mixture is extracted by means of ether. The combined ethereal extracts are washed with water to neutral reaction, dried over magnesium sulfate, and evaporated to dryness in a vacuum and in a nitrogen atmosphere. The colorless residue which represents the steroid compound of Formula IV is refluxed in a mixture of 10 cc. of concentrated hydrochloric acid and 150 cc. of methanol for 30 minutes while passing nitrogen therethrough. After cooling, 50 cc. of water are added. The mixture is neutralized by the addition of sodium bicarbonate. Methanol is removed by distillation in a vacuum. The residue is extracted with ether. The ethereal extracts are washed with water, dried over magnesium sulfate, and evaporated to dryness in a vacuum. The residue is dissolved in cyclohexane and the solution is passed through a column of chromatographic alumina which is then eluted by benzene and chloroform. The combined eluates are evaporated to dryness. Thereby, 6 g. (62% of the theoretical yield) of 19-nor-cholestene-3-one are obtained. The crystalline compound is sufficiently pure to be converted into the acetate of the corresponding enol. It has a specific rotatory power of $[\alpha]_D^{20} = +49°$ (concentration: 1% in chloroform). The ultraviolet spectrum of an ethanol solution of said compound shows a maximum at 240 m$\mu$ with a molar extinction $\epsilon = 14,000$.

EXAMPLE 2

*Preparation of 19-Nor-3-Acetoxy-$\Delta^{3,5}$-Cholestadiene (Formula VI)*

A solution of 1 g. of crude 19-nor-cholestene-3-one obtained according to Example 1 is refluxed with a mixture of 20 cc. of acetic acid anhydride, 8 cc. of acetyl chloride and 0.8 cc. of pyridine for 2½ hours while passing nitrogen therethrough. Thereafter, the yellowish-orange reaction mixture is evaporated to dryness in a vacuum while connecting the capillary tube with a source of nitrogen. The residue is dissolved in 5 cc. of ethanol while heating. The solution is cooled in ice and crystallization is initiated by scratching. The crystals are filtered with suction, washed with ice-cold methanol, and recrystallized in the presence of an antioxidant. After cooling in ice and filtration, 0.83 g. (74% of the theoretical yield calculated for the crude starting material 19-nor-cholestene-3-one used) of the enol acetate of Formula VI are obtained. The compound melts at 97–98° C. For analytical purposes, it is recrystallized from ethanol. The pure compound melts at 98–99° C. and has a specific rotatory power of $[\alpha]_D^{20} = -102° \pm 2°$ (concentration: 1% in chloroform). $\lambda_{max.} = 236$ m$\mu$, $\epsilon = 18,900$ (in ethanol).

The compound forms small plates which are insoluble in water and soluble in alcohol, ether, acetone, benzene, and choloroform.

*Analysis.*—$C_{23}H_{44}O_2 = 412.63$: Calculated — 81.5% C; 10.75% H. Found: 81.3% C; 10.7% H.

This compound has not been described in the literature.

EXAMPLE 3

*Preparation of 19-Nor-Cholesterol*

10 cc. of tetrahydrofuran, 10 cc. of methanol, and 10 cc. of water are added to 0.5 g. of 19-nor-3-acetoxy-$\Delta^{3,5}$-cholestadiene of Formula VI while stirring and passing nitrogen through the reaction vessel. The mixture is then boiled under reflux. 1.5 g. of potassium boron hydride are carefully added, and refluxing and stirring is continued for 2 more hours. After cooling, two colorless and transparent layers are formed. The mixture is cooled with ice, acidified by carefully adding 1.5 cc. of acetic acid with stirring, concentrated in a vacuum to about half its volume, and extracted with chloroform. The combined chloroform extracts are washed with water, dried over anhydrous magnesium sulfate, filtered, and evaporated to dryness in a vacuum. The resulting oily residue crystallizes on trituration with ice-cold methanol. The crystals are filtered, washed with methanol, and, for analysis, recrystallized twice from methanol. Due to a certain solubility of the compound in methanol, only 0.174 g. (39% of the theoretical amount) of pure 19-nor-cholesterol with a melting point of 109–110° C. (with decomposition) and a specific rotary power of $$[\alpha]_D^{20} = +15° \pm 2°$$

(concentration: 1% in chloroform) are obtained.

The compound crystallizes as needles arranged in clusters which are insoluble in water and soluble in ethanol, ether, acetone, benzene, and chloroform.

*Analysis.*—$C_{26}H_{44}O = 372.61$: Calculated—83.8% C; 11.9% H; 4.29% O. Found: 83.7% C; 11.9% H; 4.0%.

This compound has not been described in the literature.

In order to avoid the losses resulting from recrystallization, the oily residue obtained after evaporation of the chloroform solution is directly converted into the 3,5-dinitrobenzoate by reacting said oil with dinitro benzoyl chloride in the presence of pyridine or methyl ethyl pyridine and saponifying the resulting ester to pure 19-nor-cholesterol.

EXAMPLE 4

*Preparation of the 3,5-Dinitrobenzoate of 19-Nor-Cholesterol*

The methanolic mother liquors resulting from the recrystallization of 19-nor-cholesterol according to Example 3 and containing about 0.25 g. of said compound are precipitated by the addition of water and the resulting mixture is extracted with chloroform. The chloroform extracts are washed with water, dried over anhydrous magnesium sulfate and evaporated to dryness. Adhering traces of chloroform are removed by the addition of benzene and distillation of the mixture. The residue is dissolved in 10 cc. of benzene. First 2 cc. of pyridine and then a solution of 1 g. of 3,5-dinitrobenzoyl chloride in 5 cc. of benzene are added to the benzene solution which contains about 0.24 g. of 19-nor-cholesterol. The mixture is heated at 40° C. for 30 minutes. After the addition of ice, insoluble matter is removed by filtration. The benzene solution is washed successively with water, a saturated aqueous solution of sodium bicarbonate, N hydrochloric acid, again with water, a saturated solution of sodium bicarbonate, and finally with water. The solution is dried over magnesium sulfate and evaporated to dryness. The residue is recrystallized from a mixture of benzene and methanol (1:1). 0.24 g. (60% of the theoretical amount) of pale yellow platelets are obtained which are insoluble in water and alcohol, very slightly soluble in ether, and soluble in acetone, benzene, and chloroform. The resulting dinitrobenzoate of 19-nor-cholesterol contains one third of the molecule of benzene as solvent of crystallization per molecule of ester. The compound melts at 188–190° C. and has a specific rotatory power of $[\alpha]_D^{20} = +25° \pm 2°$ (concentration: 1% in chloroform).

*Analysis.*—$C_{33}H_{46}O_6N_2 \cdot \frac{1}{3}C_6H_6 = 592.75$: Calculated—70.95% C; 8.16% H; 16.2% O; 4.73% N. Found: 71.0% C; 8.3% H; 16.5% O; 5.0% N.

This compound has not been described in the literature.

By saponification in a methanolic solution of sodium hydroxide or potassium hydroxide according to the method described hereinafter in Example 7, 19-nor-chloesterol is obtained which is identical with the compound described in Example 3.

EXAMPLE 5

*Preparation of 19-Nor-$\Delta^{4,6}$-Cholestadiene-3-One (Formula VIII)*

2 g. of 19-nor-3-acetoxy-$\Delta^{3,5}$-cholestadiene prepared according to Example 2 are suspended in a mixture of 30 cc. of acetic acid anhydride and 10 cc. of collidine with stirring while passing nitrogen through the mixture. 7.8 cc. of a solution of bromine in acetic acid obtained by dissolving 0.34 cc. of bromine in 10 cc. of acetic acid are slowly added thereto while continuing passing nitrogen therethrough and stirring. At first, partial dissolution takes place. Thereafter, the resulting brominated compound is precipitated. After addition of the bromine solution is completed, the mixture is stirred for 15 more minutes and poured into a mixture of 50 g. of sodium bicarbonate, 200 cc. of water, and 100 cc. of ether. The ethereal layer is separated, washed with water and dried over anhydrous magnesium sulfate. 2 g. of lithium bromide are dissolved in 30 cc. of dimethyl formamide and 2 g. of lithium carbonate are added to the resulting solution. The ethereal extracts obtained on bromination are added to said solution. The ether is then removed by distillation and the remaining solution is refluxed for 40 minutes while passing nitrogen therethrough. After cooling, the brown-orange colored solution is poured into a mixture of 100 cc. of water and 10 cc. of acetic acid. The resulting resinous product is extracted with ether. The combined ethereal extracts are washed with water until of neutral reaction, dried over magnesium sulfate, filtered, treated with charcoal, and evaporated to dryness while passing nitrogen therethrough. 1.7 g. of crude 19-nor-$\Delta^{4,6}$-cholestadiene-3-one of Formula VIII are obtained in the form of an orange colored oil which is insoluble in methanol and which may directly be converted without further purification into the acetate of the corresponding enol compound. The ultraviolet spectrum shows a maximum at 285 m$\mu$ with a molar extinction of $\epsilon=16,600$. The yield of the compound of Formula VIII corresponds to a yield of 57% of the theoretical yield.

EXAMPLE 6

*Preparation of 19-Nor-3-Acetoxy-$\Delta^{3,5,7}$-Cholestatriene (Formula IX)*

0.85 g. of the compound of Formula VIII prepared according to Example 5 are refluxed in a mixture of 18 cc. of acetic acid anhydride, 7 cc. of acetyl chloride, and 0.7 cc. of pyridine for 2 hours while passing nitrogen through the reaction mixture. The solution is evaporated to dryness in a vacuum. The residue is taken up with 5 cc. of ethanol. The mixture is allowed to crystallize and is cooled with ice. The crystals are filtered and washed with ice-cold methanol. The resulting crude reaction product of Formula IX is purified by recrystallization from alcohol. After filtration and drying, 0.3 g. (53% of the theoretical amount) of the compound of Formula IX are obtained. The compound melts at 73–75° C. with decomposition and has a specific rotatory power of $[\alpha]_D^{20}=+14°\pm2°$ (concentration: 1% in chloroform).

Ultraviolet spectrum (in ethanol):

| $\lambda_{max}$ | 302 m$\mu$ | 314 m$\mu$ | 329 m$\mu$ |
|---|---|---|---|
| $\epsilon$ | 15,620 | 19,700 | 13,980 |

The compound is insoluble in water, soluble in ether, acetone, benezene, and chloroform, and may be recrystallized from 10 parts of ethanol by volume. It is very rapidly affected by air and light.

*Analysis.*—$C_{28}H_{42}O_2=410.62$: Calculated—81.9% C; 10.31% H; 7.79% O. Found: 82.1% C; 10.2% H; 7.8% O.

This compound has not been described in the literature.

EXAMPLE 7

*Preparation of 19-Nor-7,8-Dehydrocholesterol (Formula X)*

0.75 g. of the compound of Formula IX prepared according to the method described in Example 6, are suspended in a mixture of 10 cc. of tetrahydrofuran, 10 cc. of methanol, and 10 cc. of water with mechanical stirring while passing nitrogen therethrough. The suspension is refluxed while continuing stirring and the passage of nitrogen. 1.5 g. of potassium boron hydride are slowly added. The mixture is refluxed for two hours, cooled with ice, and acidified by the addition of acetic acid to a pH-value of 4.5. 50 cc. of water are added and the mixture is extracted with chloroform. The combined chloroform extracts are washed with water, dried over magnesium sulfate, filtered, treated with charcoal, and evaporated to dryness. The chloroform retained by the residue is removed by addition of benzene and repeated evaporation to dryness. The resulting crude 19-nor-7,8-dehydrocholesterol of Formula X is purified by means of its dinitrobenzoate. For this purpose, it is taken up in 20 cc. of benzene and 2 cc. of pyridine. 2 g. of 3,5-dinitro benzoyl chloride dissolved in 10 cc. of benzene are added. The mixture is heated at 40° C. for 30 minutes. 10 cc. of water are added. After cooling with ice and filtration, the benzene layer is successively washed with water, a saturated aqueous solution of sodium bicarbonate, again with water, N hydrochloric acid, again with water, a saturated sodium bicarbonate solution, and, finally with water. After drying over magnesium sulfate and filtration, the benzene solution is evaporated to dryness. The residue is taken up in ether. Crystallization is initiated by scratching. The mixture is cooled with ice. The crystals are filtered. 0.53 g. (52% of the theoretical amount) of the 3,5-dinitrobenzoic acid ester of 19-nor-7,8-dehydrocholesterol-3 are obtained. The compound melts at 170–175° C. After recrystallization from a mixture of benzene-alcohol, the compound forms large yellow-orange plates having a melting point of 185° C. The crystals are insoluble in water and alcohol, very slightly soluble in ether, quite soluble in acetone, and soluble in chloroform and benzene.

This compound has not yet been described in the literature.

0.3 g. of said 3,5-dinitro benzoic acid ester of 19-nor-7,8-dehydrocholesterol-3 are dissolved in a mixture of 1 cc. of benzene, 5 cc. of ether, and 2 cc. of methanol. 1 cc. of a 20% methanolic potassium hydroxide solution is added. The mixture is stirred for 2½ hours while passing nitrogen therethrough and is poured into water. The organic layer is separated, washed with water until the wash waters are neutral, dried over anhydrous magnesium sulfate, and evaporated to dryness in a vacuum in a nitrogen atmosphere. The resulting residue which represents the desired 19-nor-7,8-dehydrocholesterol is dissolved in methanol. Water is added until the solution starts to become turbid. The compound crystallizes in colorless needles which are arranged in clusters. 0.16 g. (82% of the theoretical amount) of 19-nor-dehydrocholesterol of the melting point 112° C. (with decomposition) are obtained.

The product is insoluble in water, slightly soluble in alcohol, and soluble in ether, acetone, and benzene.

Ultraviolet spectrum (in ether):

| $\lambda_{max}$ | 263 m$\mu$ | 272 m$\mu$ | 283 m$\mu$ | 297 m$\mu$ |
|---|---|---|---|---|
| $\epsilon$ | 6,500 | 9,550 | 10,000 | 5,750 |

This compound has not been described in the literature.

We claim:
1. 19-nor-3-methoxy-$\Delta^{2,5(10)}$-cholestadiene.
2. In a process of preparing 19-nor-cholesterol of the formula

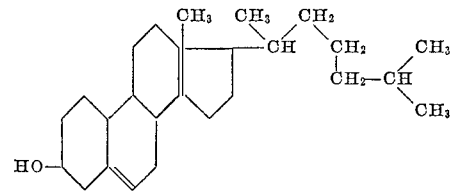

the steps which comprise adding sodium hydroxide and dimethyl sulfate in portions to a boiling solution of 19-nor-3-hydroxy-1,3,5(10)-cholestatriene in methanol, adding the resulting 19-nor-3-methoxy-1,3,5(10)-cholestatriene to a mixture of liquid ammonia and ether at a temperature not substantially exceeding −65° C., adding to the resulting solution at said temperature lithium metal in portions until reduction to 19-nor-3-methoxy-$\Delta^{2,5(10)}$-cholestadiene is substantially completed, refluxing said compound with hydrochloric acid in methanol, refluxing the resulting 19-nor-$\Delta^4$-cholestene-3-one with a mixture of acetic anhydride and acetyl chloride with the addition of pyridine, and boiling under reflux the resulting 19-nor-3-acetoxy-$\Delta^{3,5}$-cholestadiene in a mixture of tetrahydrofuran, methanol, and water with the addition of an alkali metal boron hydride to cause reduction to 19-nor-cholesterol.

3. In a process of preparing 19-nor-7,8-dehydrocholesterol of the formula

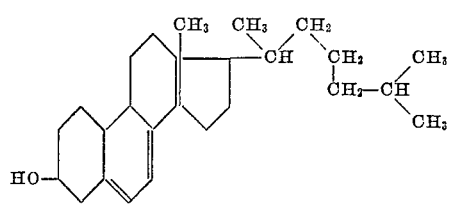

the steps which comprise adding sodium and dimethyl sulfate in portions to a boiling solution of 19-nor-3-hydroxy-1,3,5(10)-cholestatriene in methanol, adding the resulting 19-nor-3-methoxy-1,3,5(10)-cholestatriene to a mixture of liquid ammonia and ether at a temperature not substantially exceeding —65° C., adding to the resulting solution at said temperature lithium metal in portions until reduction to 19-nor-3-methoxy-$\Delta^{2,5(10)}$-cholestadiene is substantially completed, refluxing said compound with hydrochloric acid in methanol, refluxing the resulting 19-nor-$\Delta^4$-cholestene-3-one with a mixture of acetic anhydride and acetyl chloride with the addition of pyridine, adding a bromine solution in acetic acid to a suspension of the resulting 19-nor-3-acetoxy-$\Delta^{3,5}$-cholestadiene in a mixture of acetic acid anhydride and collidine, heating the mixture to complete bromination, heating under reflux a solution of the resulting 19-nor-6-bromo-$\Delta^4$-cholestene-3-one with lithium bromide and lithium carbonate in dimethyl formamide, refluxing 19-nor-$\Delta^{4,6}$-cholestadiene-3-one obtained thereby in a mixture of acetic anhydride and acetyl chloride with the addition of pyridine, and adding an alkali metal boron hydride to a suspension of the resulting 19-nor-3-acetoxy-$\Delta^{3,5,7}$-cholestatriene in a mixture of tetrahydrofuran, methanol, and water, while boiling under reflux to cause reduction to 19-nor-7,8-dehydrocholesterol.

4. The process according to claim 3, wherein the crude 19-nor-7,8-dehydrocholesterol is purified by heating a benzene solution of the crude 19-nor-7,8-dehydrocholesterol in benzene with 3,5-dinitro benzoyl-chloride with the addition of pyridine at 40° C. to cause formation of the 3,5-dinitro benzoate, recrystallizing said ester from ether, and stirring the solution of the crystalline ester in a mixture of benzene, ether, and methanol with a methanolic alkali hydroxide solution to cause saponification to substantially pure 19-nor-7,8-dehydrocholesterol.

References Cited in the file of this patent

Wallis et al.: J.A.C.S., vol. 59, pages 137–40 (1937).
Huber et al.: J.A.C.S., vol. 67, pages 609–17 (1945).
Wilds et al.: J.A.C.S., vol. 68, pages 1712–15 (1946).
Barton et al.: J.A.C.S., vol. 72, pages 1066–70 (1950).
Romo et al.: J. Org. Chem., vol. 15, pages 1289–92 (1950).
Dauben et al.: J.A.C.S., vol. 73, page 4496 (1951).
Dauben et al.: J.A.C.S., vol. 73, pages 4463–4 (1951).
Cox et al.: Can. J. Chem., vol. 29, pages 398–408, (1951).
Pesez: Bull. Soc. Chim., France, March 1958, pages 369–371.